United States Patent
Clark

(10) Patent No.: US 7,848,243 B2
(45) Date of Patent: Dec. 7, 2010

(54) METHOD AND SYSTEM FOR ESTIMATING MODEM AND FAX PERFORMANCE OVER PACKET NETWORKS

(75) Inventor: Alan D. Clark, Duluth, GA (US)

(73) Assignee: Telchemy, Inc, Duluth, GA (US)

( * ) Notice: Subject to any disclaimer, the term of this patent is extended or adjusted under 35 U.S.C. 154(b) by 186 days.

(21) Appl. No.: 12/018,607

(22) Filed: Jan. 23, 2008

(65) Prior Publication Data
US 2008/0175164 A1     Jul. 24, 2008

Related U.S. Application Data

(60) Provisional application No. 60/886,224, filed on Jan. 23, 2007.

(51) Int. Cl.
*G06F 11/00* (2006.01)
(52) U.S. Cl. .................................. 370/241
(58) Field of Classification Search ............... 370/252, 370/241
See application file for complete search history.

(56) References Cited

U.S. PATENT DOCUMENTS

| 4,905,282 | A  | * | 2/1990  | McGlynn et al. | 380/266  |
| 5,550,908 | A  | * | 8/1996  | Cai et al.     | 379/215.01 |
| 2002/0061012 | A1 | * | 5/2002  | Thi et al.     | 370/352  |
| 2004/0218546 | A1 | * | 11/2004 | Clark          | 370/252  |

OTHER PUBLICATIONS

T. Friedman, et al.; TRP Control Protocol Extended Report; Nov. 2003.

* cited by examiner

*Primary Examiner*—Derrick W Ferris
*Assistant Examiner*—Mang Yeung
(74) *Attorney, Agent, or Firm*—Smith, Gambrell & Russell

(57) ABSTRACT

A system and method for providing service quality metrics related to the quality of service provided by a Voice over Internet Protocol ("VoIP") network to voiceband modems or fax machines communicating over the VoIP network. The system utilizes a multi-state Markov model to evaluate the quality of service provided by the VoIP network and provides an assessment of the suitability of the network to carry voiceband data traffic.

4 Claims, 4 Drawing Sheets

METHOD AND SYSTEM FOR ESTIMATING MODEM AND FAX PERFORMANCE OVER PACKET NETWORKS

CROSS-REFERENCE TO RELATED APPLICATIONS

This application claims priority to U.S. provisional application No. 60/886,224, filed Jan. 23, 2007, which is incorporated herein by reference.

BACKGROUND OF THE INVENTION

The invention relates to a method and system for estimating the performance of modems and facsimile ("fax") machines that communicate over a packet-switched network.

Voice over Internet Protocol ("VoIP") services are widely used today to carry voice telephone conversations over packet-switched networks in digital form. Traditional voiceband modems and fax machines can be connected to such VoIP networks to transmit data over a packet-switched network instead of traditional circuit-switched telephone networks.

It is well known that VoIP services can suffer from performance degradation due to packet loss or packet delay. Service quality monitoring systems have been developed to measure the effects of packet loss or delay on telephone conversations carried over such VoIP networks. These service quality monitoring systems attempt to estimate the subjective experience of end-users speaking over the VoIP network.

Such service quality monitoring ("SQM") systems typically monitor such things as packet loss rates, packet delay variation levels, and general packet delay times in order to estimate service quality. Further, because packet loss and delay rates usually vary significantly over time, SQM systems often analyze the distribution over time of packet losses and delay rates. SQM systems can convey the results of their service quality analysis as individual parameters such as packet loss rates and packet delay variation. Alternatively, SQM systems can output estimates of subjective end-user quality levels such as a Mean Opinion Score ("MOS") rating that attempts to encapsulate the end-user's subjective experience on a single scale (such as a 0-100 scale.) Current SQM systems are adapted to measure the effect of packet losses and delays on voice conversations, however, and do not measure the effect of such disruptions on voiceband modems or fax machines that communicate over VoIP networks.

It is well known that voiceband modems and fax machines are very sensitive to packet losses and packet delay variation. When a voiceband modem or fax machine first establishes a connection over a communication channel, the data modulation encoder/decoder ("datapump") of the modem or fax machine first goes through a training sequence to learn some characteristics of the communication channel in order to evaluate the channel and optimize its transmission speed over the channel. Many users are familiar with the series of tones and hisses produced during the training sequence. After completing the training sequence, the voiceband modem or fax machine will commence sending and receiving data packets over the communication channel.

If, however, the communication channel is unreliable and data packets are lost or unduly delayed, the voiceband modem or fax machine will need to repeat the training sequence in order to re-synchronize its connection with its counterpart on the other end of the communication channel and to re-evaluate the transmission quality of the channel and adapt accordingly. Such a repetition of the training sequence is called the "retrain" process and results in a degradation of service.

At the beginning of the retrain process, the datapump of the modem or fax machine will usually wait a short period to allow the communication channel to recover from its degraded state. Such a waiting period is typically from ½-1 second in length. After the waiting period, the datapump will begin the active portion of the retrain sequence where the data pump re-analyzes the communication channel and re-synchronizes with the other modem or fax machine on the other end of the communication channel. The active portion of the retrain sequence can typically last between 5-15 seconds.

If losses on the communication channel cause further packet losses or undue packet delay during the retrain sequence, then the modem or fax machine will have to terminate the retrain sequence and begin another retrain sequence. If the communication channel is extremely unreliable and the modem or fax machine repeatedly fails to complete the retrain process, then the modem or fax machine will terminate the connection altogether.

SUMMARY OF THE INVENTION

The invention involves a method and system for estimating the performance and reliability of voiceband modems and fax machines that communicate over packet-switched communication channels such as VoIP.

Embodiments of the invention can estimate such performance by:

1) Identifying lost packets and packets that are discarded due to late arrival;
2) Measuring the time distribution of lost and discarded packets;
3) Estimating the amount of time lost due to dropped or delayed packets;
4) Estimating the amount of time spent by a modem or fax machine in the retrain state;
5) Estimating the amount of time spent by a modem or fax machine performing normal data communication functions;
6) Estimating the proportion of time spent in the retrain state and thus determining the data throughput of the modem or fax machine; and
7) Estimating the reliability of the communication channel and the likelihood that a modem or fax connection will be terminated altogether based on the proportion of lost data packets and the time spent in the retrain state.

Such reliability metrics can even be performed on communications channels that do not currently carry data traffic from voiceband modems or fax machines. For instance, an embodiment of the invention could be utilized to analyze a given VoIP network that currently carries only voice telephone conversations. The invention could analyze lost and discarded packets on the VoIP network carrying voice data for the network's suitability to carry voiceband modem or fax machine data.

DETAILED DESCRIPTION

Figure 1:
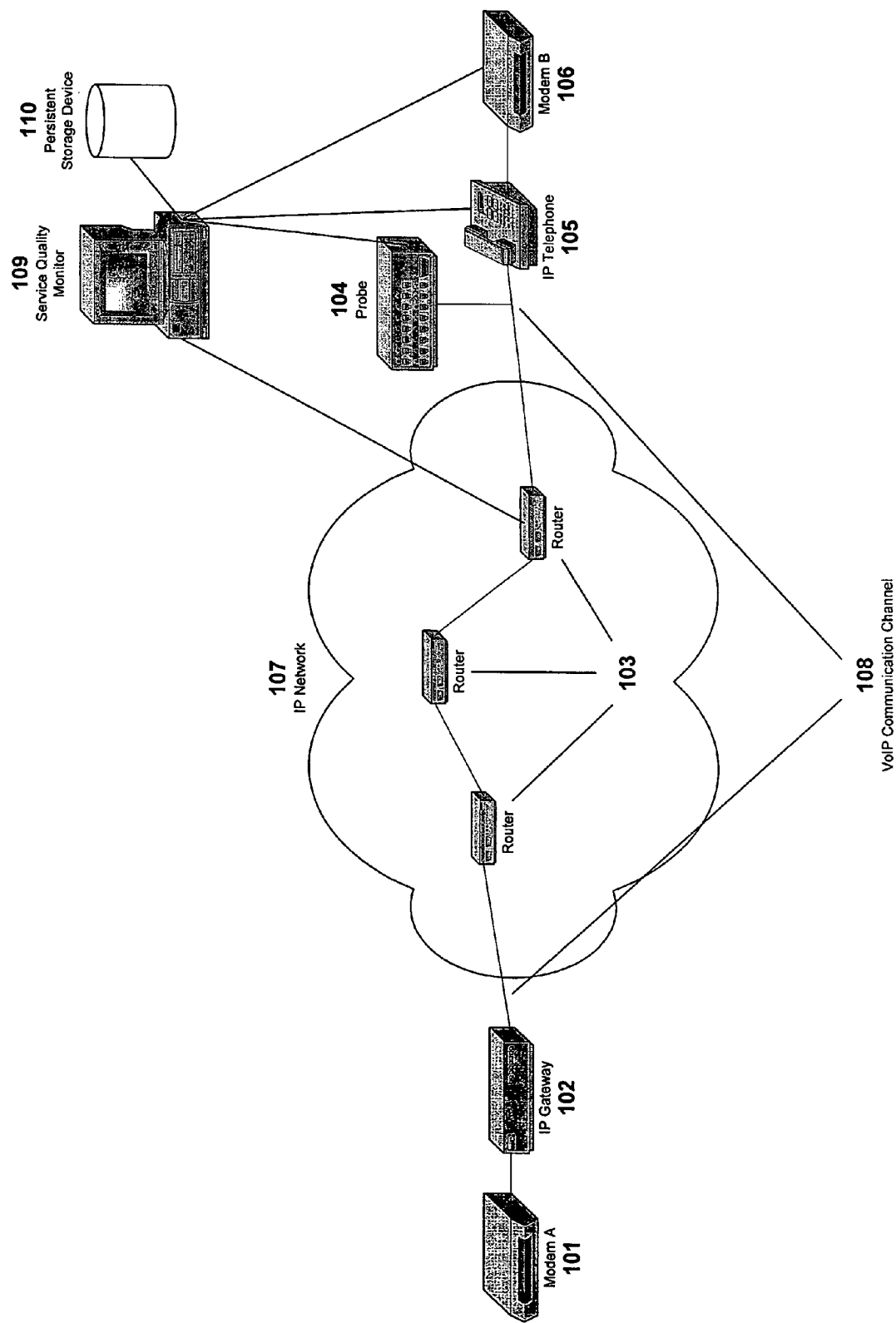
FIG. 1 is a block diagram of a service quality monitoring system in an embodiment of the invention.

In some embodiments of the invention, the distribution of lost and discarded packets sent over a VoIP channel is measured using a multi-state Markov model ("VQmon Markov Model"), as defined in the VoIP Metrics Report Block in RFC 3611 (RTP Control Protocol Extended Reports), published by the Internet Engineering Task Force which is incorporated herein by reference. This model utilizes the average length and average density of lost and discarded packets in "bursts" and "gaps". A gap is defined as a period of time during which all lost or discarded packets are separated by at least "Gmin" received packets, where Gmin is a configuration parameter. A typical value for Gmin is 16.

A burst is defined as any period of time falling outside a gap. More informally, a burst is a period of time with high packet losses resulting in poor communication quality over the VoIP channel. Conversely, a gap is a time period with few packet losses and relatively good communication quality over the VoIP channel.

The VQmon Markov Model has the following parameters ("Burst and Gap Parameters"):

| Parameter | Description |
| --- | --- |
| Blen | Burst Length |
| Bden | Burst Density (the proportion of lost/discarded packets within a single burst or average over multiple bursts) |
| Glen | Gap Length |
| Gden | Gap Density (the proportion of lost/discarded packets within a single gap or average over multiple gaps) |

Blen and Glen have time units and are typically measured in seconds or milliseconds. Bden and Gden are measured as proportions.

Different embodiments of the invention measure these Burst and Gap Parameters over different time periods. Some embodiments will measure gaps and bursts over time and maintain average values for Blen, Bden, Glen, and Gden. Some embodiments will maintain values for only the most recent burst and gap. Some embodiments will identify each discrete packet loss or discard event and maintain Burst and Gap Parameter values for each particular event. Some embodiments will use various combinations of the above such as maintaining average values for Glen and Gden but recording Blen and Bden for each discrete packet loss event.

Some embodiments of the invention can measure these Burst and Gap Parameters utilizing a variety of different devices or methods. For instance, a VoIP endpoint system such as an IP phone or gateway could measure the parameters. A router or probe could measure the parameters in the middle of the VoIP stream. The modem or fax machine itself could measure the parameters. In different embodiments, the parameters could be measured in software, hardware, or a combination of both.

Some embodiments of the invention include the following parameters ("Device Retrain Parameters"):

| Parameter | Description |
| --- | --- |
| Twait | The length of time following a lost/discarded packet when the modem or fax machine pauses before beginning the retrain sequence. |
| Tret | The length of time spent by the modem or fax machine performing the retrain sequence including Twait. |

Twait and Tret have time units. Typical values for Twait are from 0.5-1.0 seconds. Typical values for Tret are from 5-15 seconds. As noted above, Tret is inclusive of Twait. That is, Tret includes not only the amount of time spent by the modem or fax machine in the active retrain state but also the preceding amount of time (Twait) that the modem or fax machine (hereinafter "Device") was idle before entering the retrain state.

Some embodiments of the invention can measure the time spent by the Device in the waiting and retrain states, respectively. Different embodiments of the invention can measure these values over different time periods. Some embodiments will measure Twait and Tret only one time, usually at the beginning of the evaluation period. Some embodiments will keep average values of Twait and Tret. Some embodiments will maintain only the latest values of Twait and Tret. Some embodiments will maintain discrete Twait and Tret values for each discrete packet loss or discard event. Some embodiments will use various combinations of the above.

Alternatively, in some embodiments of the invention, Twait and Tret are simply specified by a person. For instance, the owner of a Device could simply read the technical specifications for a given Device and enter those values into an embodiment of the invention.

Some embodiments of the invention include some or all of the following parameters ("Device Transmission Parameters"):

| Parameter | Description |
| --- | --- |
| Nominal Device Transmission Speed (NDTS) | Speed at which the modem or fax machine transmits or receives data (measured in bits per second) |
| Packetized Device Transmission Speed (PDTS) | Rate at which the modem or fax machine output is digitized and packetized for transmission over a Voice over IP system (measured in packets per second) |
| Packet Size (PS) | Size of a single data packet or average data packet (measured in bits per packet) |

NDTS is the speed at which the modem or fax datapump operates and is typically 9600, 14400, 33600, or 56000 bits per second or a similar standardized transmission speed.

The audio signal from the modem or fax machine is digitized and transmitted in packets. Typically a modem or fax signal would be encoded using ITU-T G.711 PCM at 64000 bits per second, and the 64000 bits per second transmitted in packets containing 640 or 320 bits. PDTS is the resulting rate of packets per second.

Depending on the characteristics of the Device, the Packet Size (PS) parameter can be a fixed value that does not change. That is, certain Devices transmit packets of a fixed length. In such situations, it is irrelevant whether PS is measured as an average or of a discrete packet.

Some Devices, however, transmit (or receive) packets of varying lengths. In such situations, PS can be maintained as an average value over multiple packets or PS can equal the exact size of each packet that is sent over the VoIP channel.

Some embodiments of the invention can directly measure some or all of the Device Transmission Parameters. These measurements can occur in hardware, software, or in a combination of both. The parameters can be measured at a communication endpoint such as in an IP phone, a gateway, or the Device itself. The parameters can also be measured in the middle of the VoIP stream by a router or probe.

Alternatively, in some embodiments of the invention, some or all of the Device Transmission Parameters can be entered by a person. For instance, a person could configure the transmission speed for a particular VoIP channel and use that value for the NDTS. Similarly, a person could specify the packet size that is to be sent over the VoIP channel and use that value.

Embodiments of the invention calculate various service quality metrics based on the aforementioned parameters. Such metrics can include the following:

| Metric | Description |
| --- | --- |
| Tlost | Time lost during a burst/gap cycle due to Device retrain sequences |
| Throughput Factor | Percent of time during which the modem or fax machine is able to transmit data |
| Throughput Rate | Effective data transmission rate (in bits per second) |
| Reliability Factor | Service quality metric indicating reliability of VoIP communication channel for voiceband modem and fax communications (on a 0-100 scale) |

Such metrics can be calculated on a continuous basis using the latest input parameter values, measured in real-time. The metrics can also be calculated using average or representative values for the input parameters, as discussed above.

FIG. 1 is a representation of a system in accordance with an embodiment of the invention. In FIG. 1, two voiceband modems (or fax machines) 101, 106 are communicating over a VoIP communication channel 108. A service quality monitor 109 is monitoring one of the voiceband modems 106 and the VoIP communication channel 108. The service quality monitor 109 is gathering data related to the communication channel and processing it as discussed more fully below. The service quality monitor 109 can be implemented in hardware, software, or a combination of both. It can be embodied in a general purpose computer or in a special-purpose device including, but not limited to, ROM, RAM, EEPROM, flash memory, or integrated circuit devices.

The VoIP communication channel 108 can be carried by any network 107 capable of supporting Internet Protocol (IP) communications. Such networks include the public internet and private local area or wide area networks.

The voiceband modems 101, 106 of the invention are connected to the VoIP channel 108 by way of devices 102, 105 that convert the modems' analog voiceband signals into a digital packetized signals. In FIG. 1, the first modem ("Modem A") 101 is connected to the VoIP channel 108 through an Internet Protocol Gateway device 102. The second modem ("Modem B") 106 is connected to the VoIP channel 108 through an Internet Protocol telephone 105.

The service quality monitor 109 can monitor the communications over the VoIP channel 108 by gathering data related to the communication quality over the channel 108. The service quality monitor 109 can gather such data from a probe 104 that is placed somewhere in the IP network 107. Such a probe 104 can be a special-purpose device including, but not limited to, ROM, RAM, EEPROM, flash memory, or integrated circuit devices. Alternatively, such a probe 104 can be embodied in a general purpose computer. The probe 104 can be implemented in hardware, software, or a combination of both. The service quality monitor 109 can also gather service quality data from routers 103 in the IP network 107 that route the data packets through the network 107.

The service quality monitor 109 can also gather data from the devices 102, 105 that connect the analog voiceband modems 101, 106 to the digital packetized VoIP channel 108. In FIG. 1, the service quality monitor 109 is gathering data from the Internet Protocol telephone 105 which connects Modem B 106 to the VoIP communication channel 108.

The Internet Protocol Gateway device 102, Internet Protocol telephone 105, IP network probe 104, and/or IP network routers 103 may provide the service quality monitor 109 with some or all of the following data: Blen, Bden, Glen, Gden, Twait, Tret, NDTS, PDTS, and PS. In addition, the service quality monitor 109 can gather some or all of such data from the modem or fax machines 101, 106 themselves or such data may be input manually. In some embodiments of the invention, the service quality monitor 109 will store such values in a persistent storage device 110 such as a disk hard drive, CD-ROM, DVD-ROM or other optical disc storage, flash memory device, ROM, RAM, EEPROM, floppy disk, magnetic tape, or any similar device. After calculating various service quality metrics, the service quality monitor 109 in some embodiments will display the metrics to the user or store them in a storage device 110 for future use.

Figure 2:
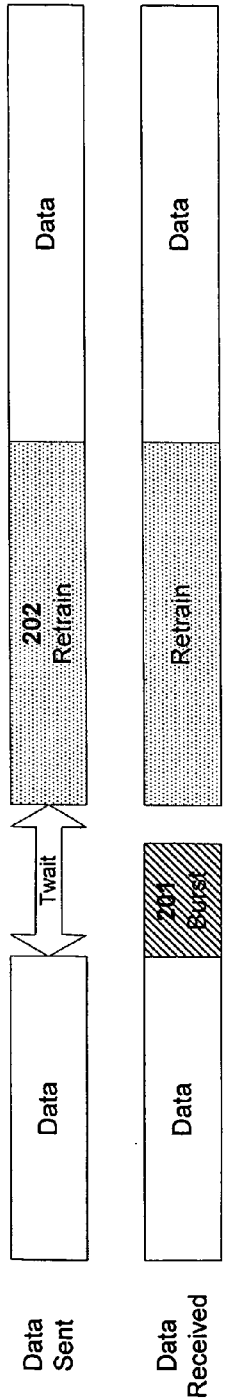
FIG. 2 is an illustration of a packet data stream on a high quality VoIP communication channel in an embodiment of the invention.
Figure 3:
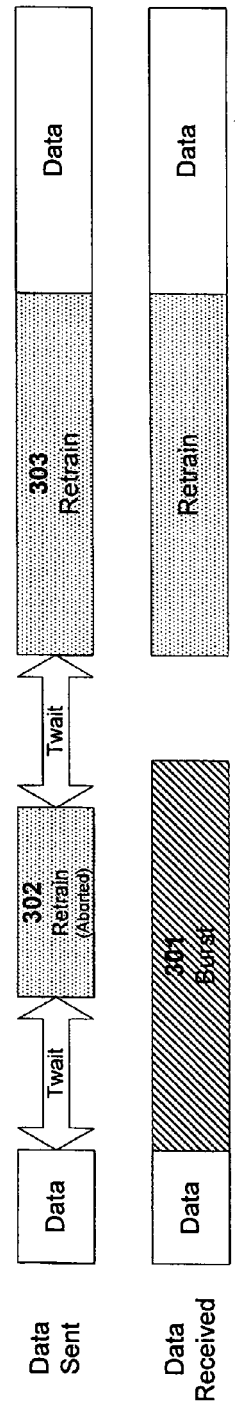
FIG. 3 is an illustration of a packet data stream on a moderate quality VoIP communication channel in an embodiment of the invention.
Figure 4:
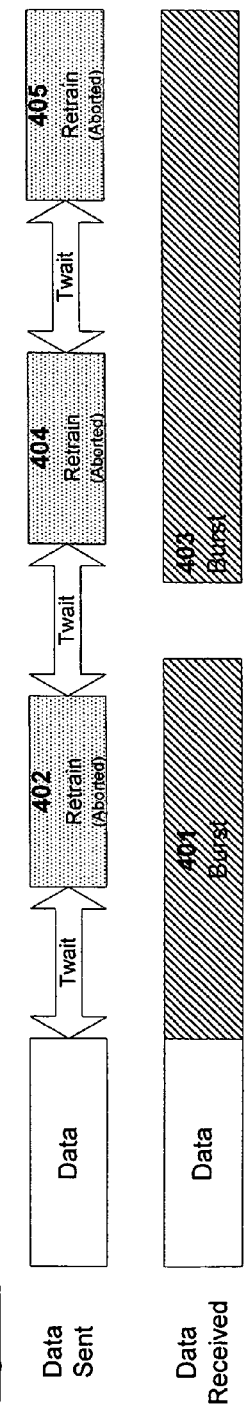
FIG. 4 is an illustration of a packet data stream on a low quality VoIP communication channel in an embodiment of the invention.

FIGS. 2, 3, and 4 illustrate packet streams on a VoIP channel with varying quality levels. Each figure has two illustrations of the same packet stream. The top portion of the figure shows the packet stream as sent by the first modem or fax machine at the beginning of the VoIP channel; the bottom portion of the figure shows the packet stream as received by the second modem or fax machine at the end of the VoIP channel. FIG. 2 shows a packet stream on a relatively high quality VoIP channel with only an occasional short burst 201 that does not interfere with the retrain sequence 202. FIG. 3 shows a packet stream on a VoIP channel of moderate quality wherein larger bursts 301 occasionally interrupt the retrain sequence 302 and cause the modem or fax machine to repeat the retrain sequence 303. FIG. 4 shows a packet stream on a poor quality VoIP channel where large or repeated bursts 401, 403 continuously interrupt the retrain sequences 402, 404, 405 and prevent the modem or fax machine from receiving any data over the VoIP channel. In such a situation the modem or fax machine is likely to terminate the connection.

Figure 5:
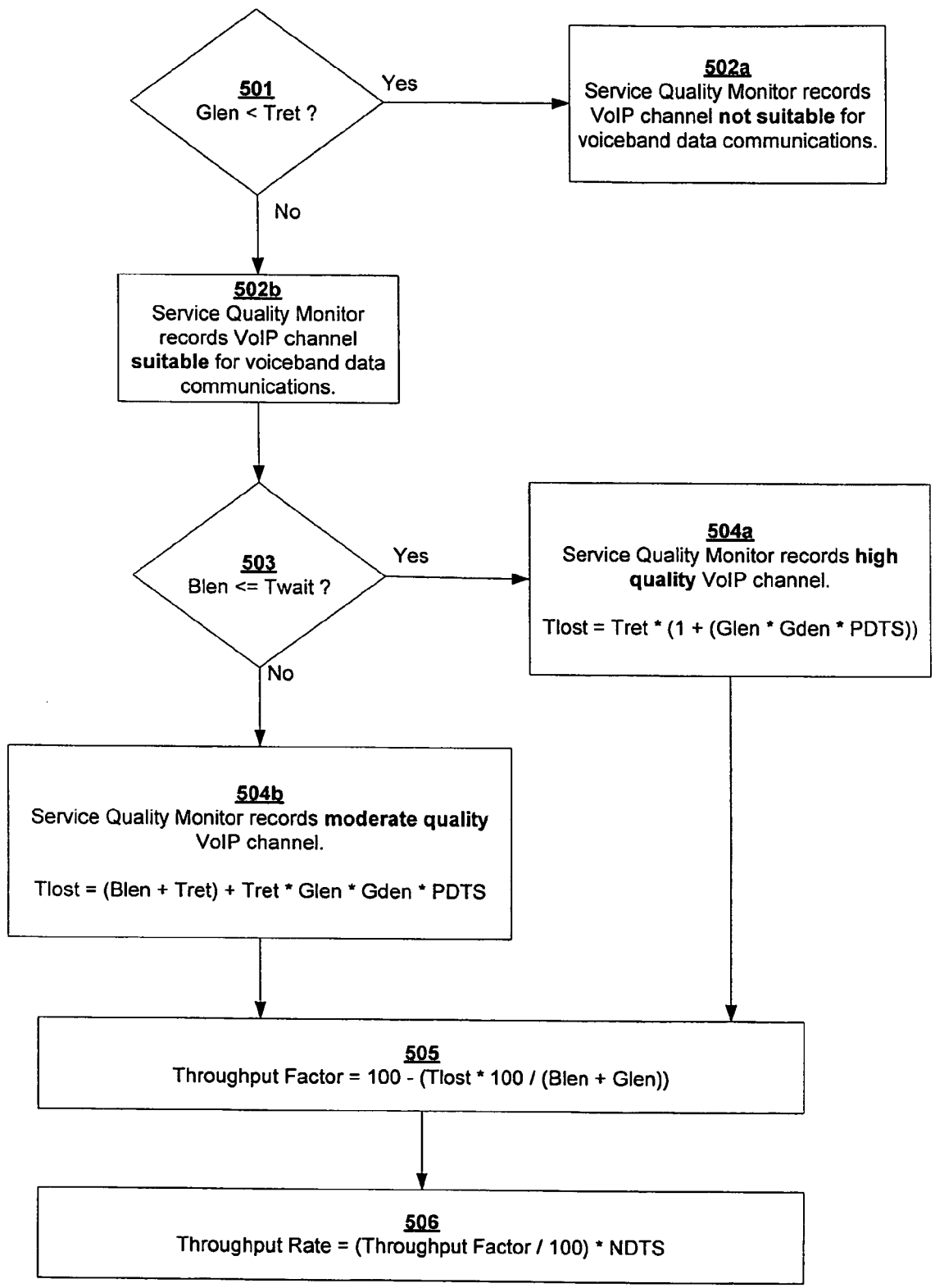
FIG. 5 is a flow chart of an exemplary method of calculating service quality metrics in an embodiment of the invention.

FIG. 5 depicts the steps of the method for calculating the Tlost, Throughput Factor, and Throughput Rate metrics. At step 501, the service quality monitor 109 analyzes the packets received at the receiving modem or fax machine (e.g., Modem B 106).

If the VoIP channel 108 is of very poor quality, as illustrated in FIG. 4, then the receiving modem 106 will be unable to complete the retrain sequence and will terminate the connection at step 502a. More specifically, if the average gap length is less than Tret, then the receiving modem 106 will terminate the connection. The termination will be recorded by the service quality monitor 109 at step 502a.

If the average gap length is greater than or equal to Tret, then the VoIP channel 108 may be suitable for data communications. This fact will be recorded by the service quality monitor 109 at step 502b.

At step 503, the service quality monitor 109 will compare the length of the burst(s) (Blen) with the modem's waiting period (Twait). As described earlier, Blen can be an average length of bursts over time or the length of the most recent burst. If Blen is less than or equal to Twait, then the service quality monitor 109 will record, at step 504a, that the VoIP communication channel 108 is of high quality and is suffering only from short bursts, as illustrated by FIG. 2. If Blen is greater than Twait, then the service quality monitor 109 will record, at step 504b, that the VoIP communication channel 108 is of moderate quality and is suffering from moderate bursts, as illustrated by FIG. 3.

At step 504a, the service quality monitor 109 will calculate the time lost (Tlost) in a burst/gap cycle due to bursts on a high quality VoIP channel 108. The following equation is utilized to calculate Tlost in such a situation:

$$Tlost = Tret * (1 + (Glen * Gden * PDTS)) \qquad (Eq.\ 1)$$

As described earlier, the values for Glen, Gden, PDTS, and Tret can be averaged over time, continuously updated, or refer only to the most recent gap/burst event, as appropriate. Furthermore, the values can sometimes be estimated, derived, or entered by a user. Thus, the value for Tlost can represent an average value over time, a continuously updated estimate, or only the most recent gap/burst event.

At step 504b, the service quality monitor 109 will calculate the time lost (Tlost) in a burst/gap cycle due to bursts on a moderate quality VoIP channel 108. The following equation is utilized to calculate Tlost in such a situation:

$$Tlost=(Blen+Tret)+Tret * Glen * Gden * PDTS \quad (Eq. 2)$$

The parameters of Eq. 2, like those of Eq. 1, can represent averaged, continuously updated, or recent event values. They can also be estimated, derived, or user-supplied.

At step 505, the service quality monitor 109 will calculate the Throughput Factor for the VoIP communication channel 108. The Throughput Factor, expressed as a percentage, is an estimate of the percent of time the VoIP channel 108 transmits useful data (rather than suffering data losses due to bursts or carrying retrain sequence packets.) The service quality monitor 109 utilizes the following equation to calculate the Throughput Factor:

$$Throughput\ Factor=100-(Tlost*100/(Blen+Glen)) \quad (Eq. 3)$$

The parameters of Eq. 3 can represent averaged, continuously updated, or recent event values. They can also be estimated, derived, or user-supplied.

At step 506, the service quality monitor 109 will calculate the Throughput Rate for the VoIP communication channel 108. The Throughput Rate is expressed in bits per second (bps) and represents the effective bit rate for communicating data packets over the VoIP channel 108. The service quality monitor 109 calculates the Throughput Rate using the following equation:

$$Throughput\ Rate=(Throughput\ Factor/100)*NDTS \quad (Eq. 4)$$

The parameters of Eq. 4 can represent averaged, continuously updated, or recent event values. They can also be estimated, derived, or user-supplied.

Figure 6:
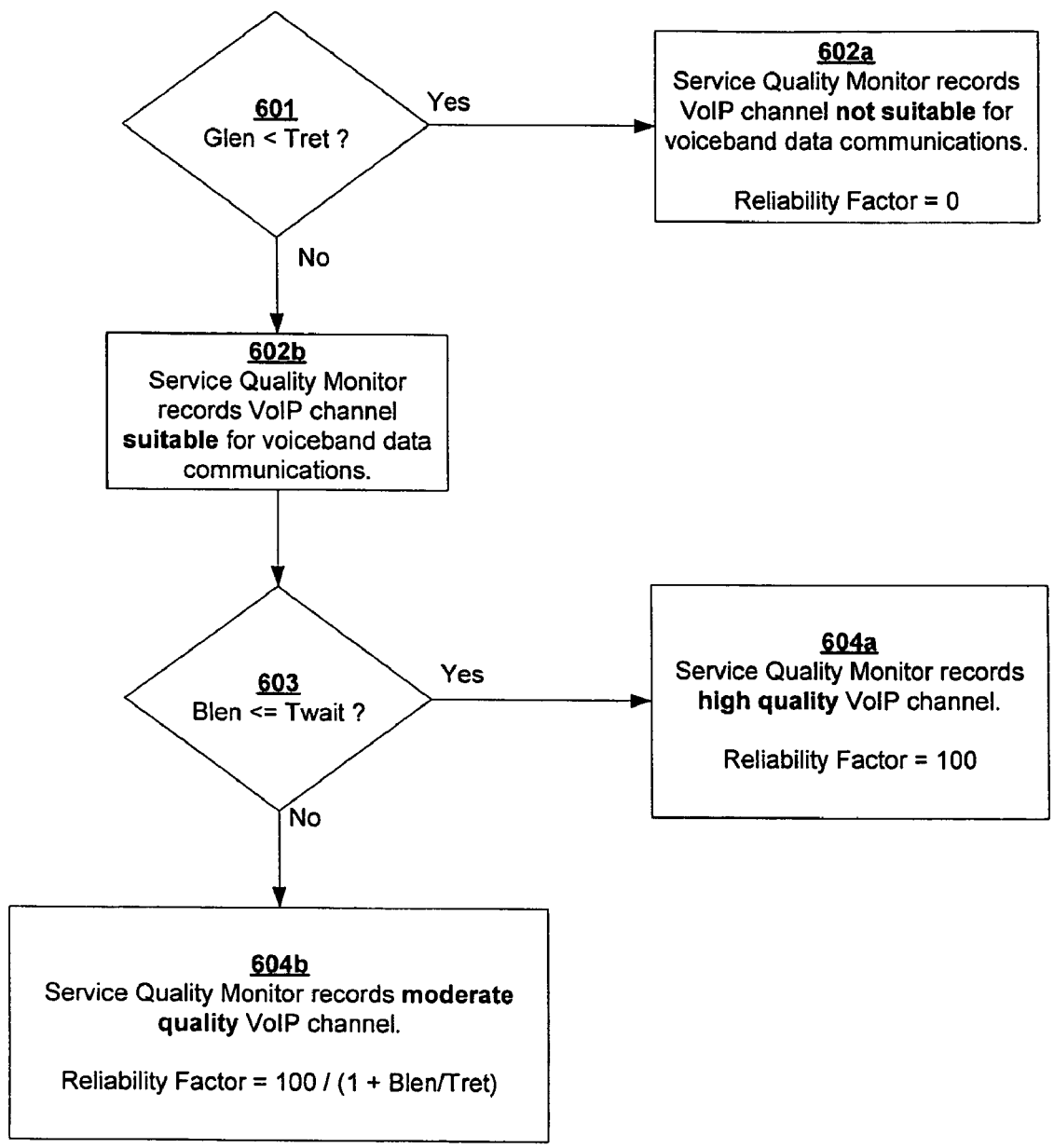
FIG. 6 is a flow chart of an exemplary method of calculating the Reliability Factor service quality metric in an embodiment of the invention.

FIG. 6 depicts the steps of the method for calculating the Reliability Factor metric. As described above, this metric is a service quality metric that indicates the suitability of the VoIP channel to carry packets containing data from voiceband modem and fax machines. At step 601, the service quality monitor 109 analyzes the packets received at the receiving modem or fax machine (e.g., Modem B 106).

If the VoIP channel 108 is of very poor quality, as illustrated in FIG. 4, then the receiving modem 106 will be unable to complete the retrain sequence and will terminate the connection at step 602a. More specifically, if the average gap length is less than Tret, then the receiving modem 106 will terminate the connection. Such termination will be recorded by the service quality monitor 109 at step 602a. The service quality monitor 109 will also record the Reliability Factor as being zero (0), indicating that the VoIP channel 108 is unsuitable for communications.

If the average gap length is greater than Tret, then the VoIP channel 108 may be suitable for data communications. This fact will be recorded by the service quality monitor 109 at step 602b.

At step 603, the service quality monitor 109 will compare the length of the burst(s) (Blen) with the modem's waiting period (Twait). As described earlier, Blen can be an average length of bursts over time or the length of the most recent burst. If Blen is less than or equal to Twait, then the service quality monitor 109 will record, at step 604a, that the VoIP communication channel 108 is of high quality and is suffering only from short bursts, as illustrated by FIG. 2. If Blen is greater than Twait, then the service quality monitor 109 will record, at step 604b, that the VoIP communication channel 108 is of moderate quality and is suffering from moderate bursts, as illustrated by FIG. 3.

At step 604a, the service quality monitor 109 will record the Reliability Factor on a high quality VoIP channel 108 as being 100.

At step 604b, the service quality monitor 109 will calculate the Reliability Factor on a moderate quality VoIP channel 108. The following equation is utilized to calculate the Reliability Factor in such a situation:

$$Reliability\ Factor=100/(1+Blen/Tret) \quad (Eq. 5)$$

Thus, the Reliability Factor on a moderate quality VoIP channel 108 will fall in the range from 0 to 100. A larger number will indicate a relatively higher quality VoIP channel while a smaller number will indicate a relatively lower quality VoIP channel. The parameters of Eq. 5 can represent averaged, continuously updated, or recent event values. They can also be estimated, derived, or user-supplied.

Accordingly, while the invention has been described with reference to the structures and processes disclosed, it is not confined to the details set forth, but is intended to cover such modifications or changes as may fall within the scope of the following claims.

What is claimed is:

1. A method for producing service quality metrics related to the communications of a plurality of voiceband modems or fax machines communicating on a packet communication channel, the method being performed by a service quality monitor and comprising the steps of:
   a) monitoring said packet communication channel to determine a burst length;
   b) monitoring said packet communication channel to determine a gap length; and
   c) calculating a performance metric for said monitored communication channel based on said monitoring steps, wherein said performance metric is selected from a Reliability Factor, a Tlost metric, and a Throughput Factor, and
   wherein said calculating step further comprises the steps of:
     i) monitoring the density ("Gden") of packet loss within said gaps;
     ii) monitoring the retrain time of one of said plurality of voiceband modems or fax machines;
     iii) monitoring the Packetized Device Transmission Speed ("PDTS") of said one modem or fax machine;
     iv) comparing said burst length to a retrain wait time of said one voiceband modem or fax machine; and
     v) determining said Tlost metric; and
   wherein said service quality monitor comprises an electronic device programmed to perform the method.

2. The method of claim 1 wherein said determining step further comprises:
   calculating said Tlost metric by the formula of (retrain time * (1+(gap length * Gden * PDTS))) if said burst length is less than or equal to said retrain wait time.

3. The method of claim 1 wherein said determining step further comprises:
   calculating said Tlost metric by the formula of ((burst length +retrain time) +retrain time * gap length * Gden * PDTS) if said burst length is greater than said retrain wait time.

4. The method of claim 1 further comprising the step of:
   calculating said Throughput Factor by the formula of (100-Tlost * 100/(burst length +gap length)).

* * * * *